United States Patent [19]

Bouvier

[11] 4,249,834
[45] Feb. 10, 1981

[54] OIL SPILL CONTAINMENT DEVICE FOR AQUATIC VESSELS

[76] Inventor: Julien J. Bouvier, 5600 S. Crain Hwy., Mitchellville, Md. 20716

[21] Appl. No.: 932,009

[22] Filed: Aug. 8, 1978

[51] Int. Cl.³ .......................... E02B 15/04; E02B 3/04
[52] U.S. Cl. ....................................... 405/70; 405/63; 114/74 R; 114/240 R; 114/267; 9/8 R; 220/208
[58] Field of Search .................. 405/211, 212, 60, 61, 405/63–72; 222/504, 67; 137/587–589; 114/240 B, 240 C, 240 D, 267, 74 R, 74 T; 24/201 B; 9/8 R, 8 P; 220/202, 205, 208, 20.5, 22; 206/509, 518, 519, 515

[56] References Cited

U.S. PATENT DOCUMENTS

| Re. 28,966 | 9/1976 | Blockwick | 405/70 |
|---|---|---|---|
| 1,369,586 | 2/1921 | Whiton | 114/240 C |
| 2,240,567 | 5/1941 | Meacham | |
| 2,992,466 | 7/1961 | Gallagher | 24/201 B |
| 3,036,739 | 5/1962 | Kamysz | 222/504 |
| 3,104,030 | 9/1963 | Howlett | 222/504 |
| 3,183,876 | 5/1965 | Kronhaus | |
| 3,611,728 | 10/1971 | Van't Hof | 405/70 |
| 3,949,877 | 4/1976 | Santoni | 206/519 |
| 4,000,532 | 1/1977 | Nielsen | 9/8 R |
| 4,015,431 | 3/1977 | Ahiko | 61/1 F |
| 4,073,143 | 2/1978 | Preus | 405/70 |

FOREIGN PATENT DOCUMENTS 2721325  11/1978  Fed. Rep. of Germany ............. 405/63

Primary Examiner—Trygve M. Blix
Assistant Examiner—D. W. Keen
Attorney, Agent, or Firm—Blair, Brown & Kreten

[57] ABSTRACT

Disclosed herein is an oil spill containment device for aquatic vessels including a flotation collar structure surrounding the periphery of the vessel to be contained, apparatus for deploying this collar including in one embodiment compressed air dispensing equipment and a cable deploying device which pays out and retracts cable as a function of tidal currents, and a sheet structure depending from and extending upwardly above the collar to constrain any oil slick or any potential thereof. Also contemplated herein is a compartmentized and containerized storage system for fuel within a cargo ship so as to minimize the likelihood of a catastrophic spill.

24 Claims, 18 Drawing Figures

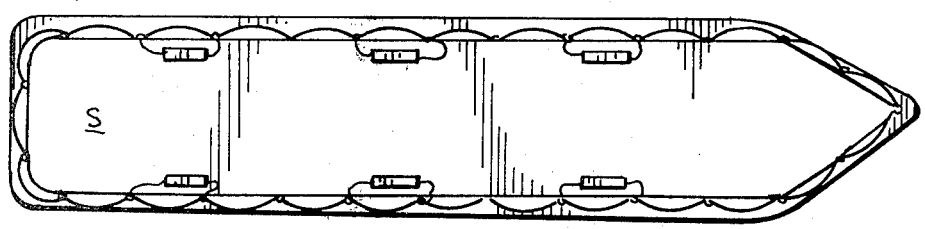
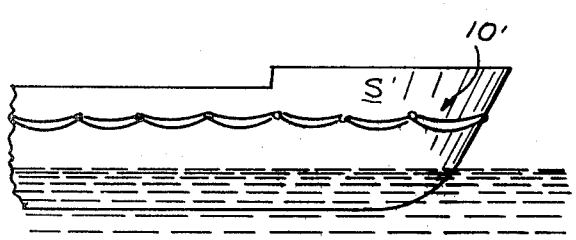
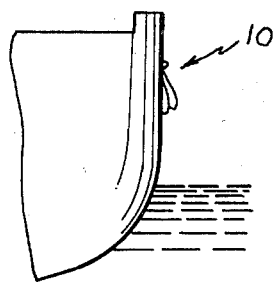
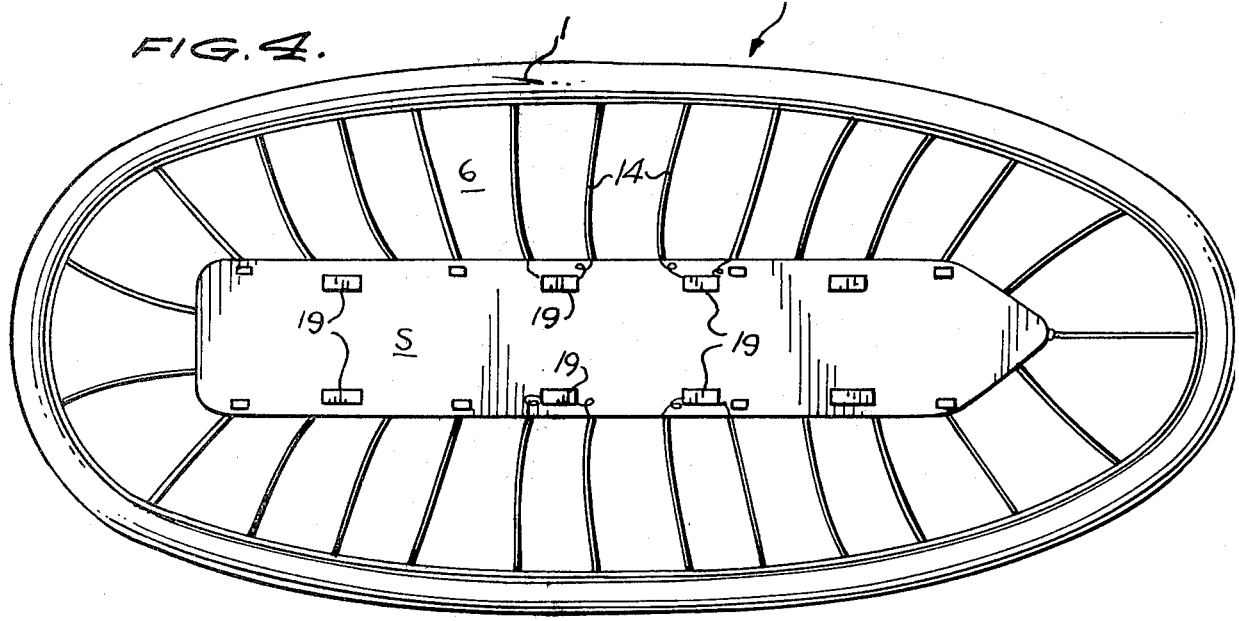
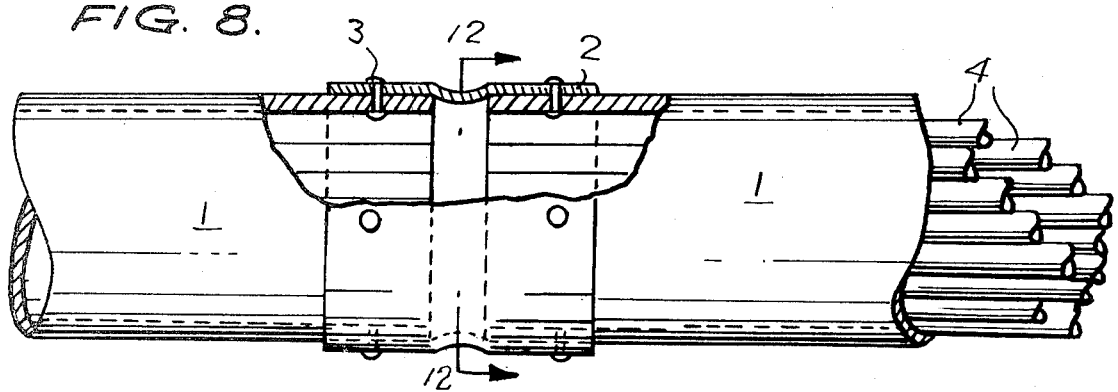

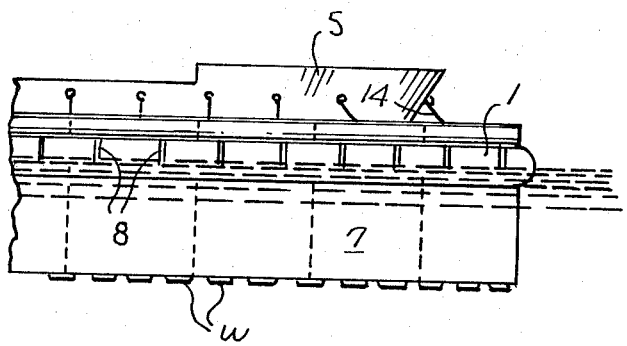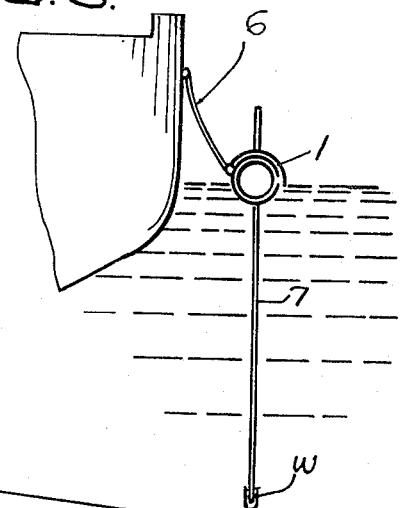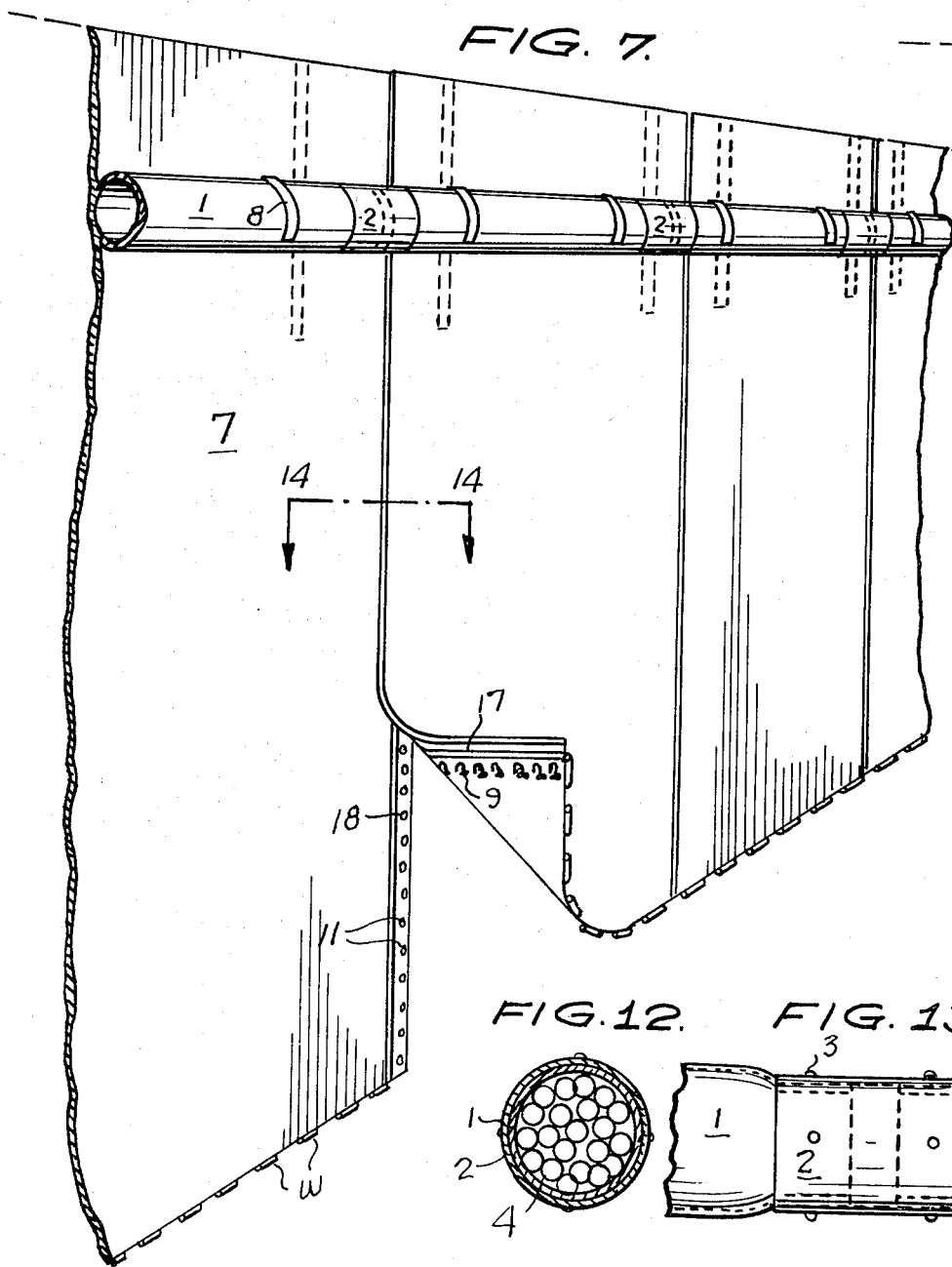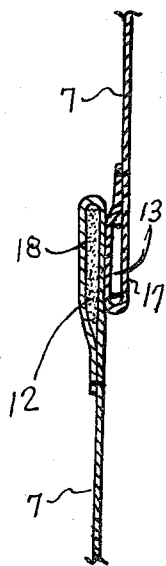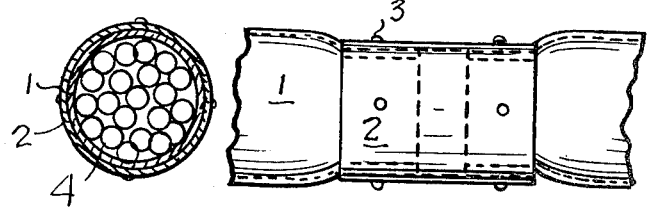

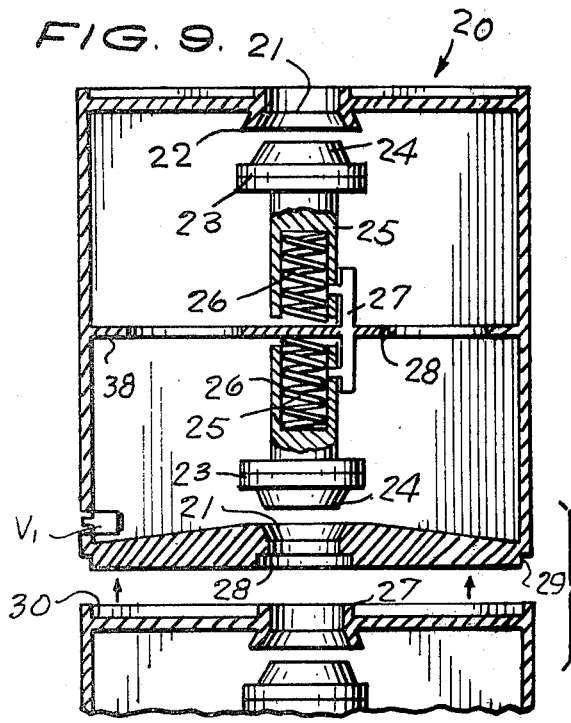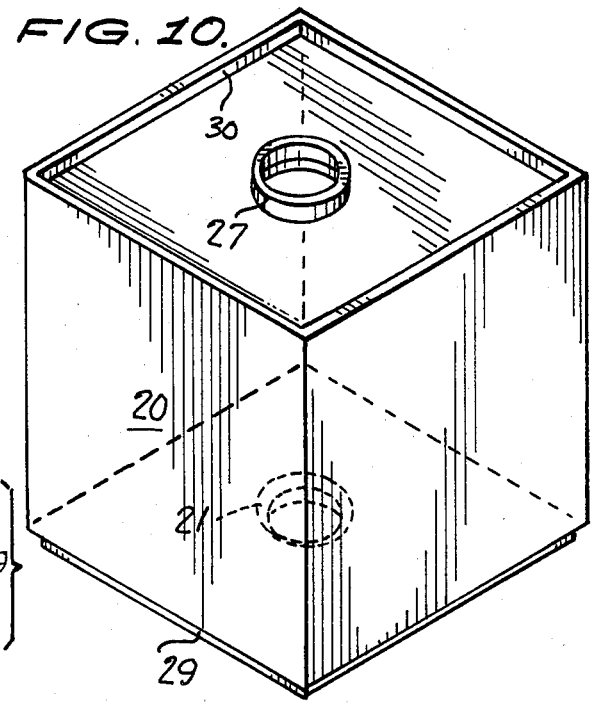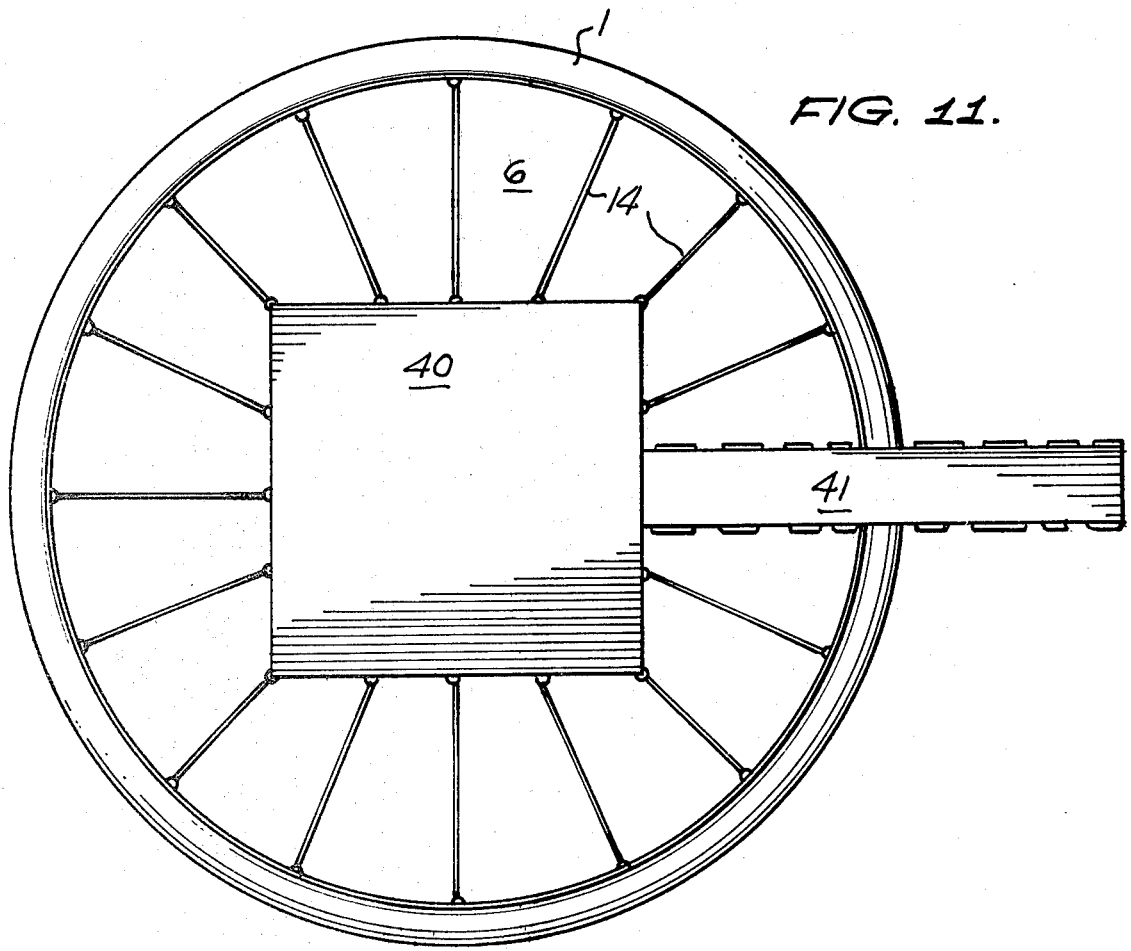

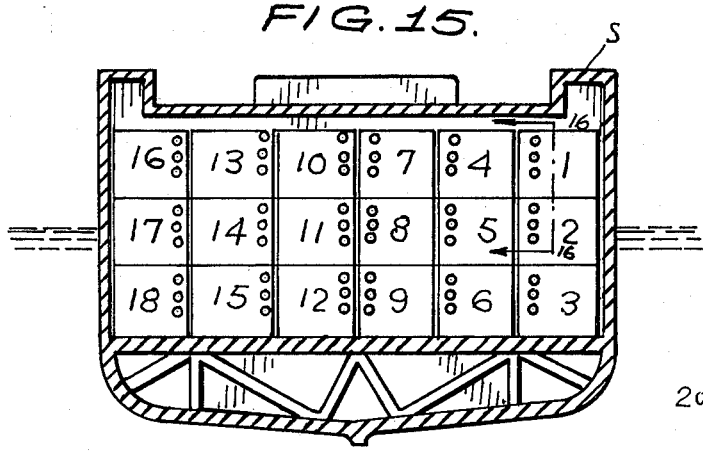
FIG. 15.
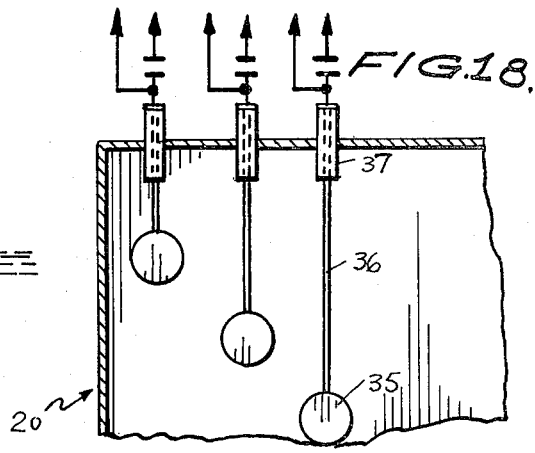
FIG. 18.
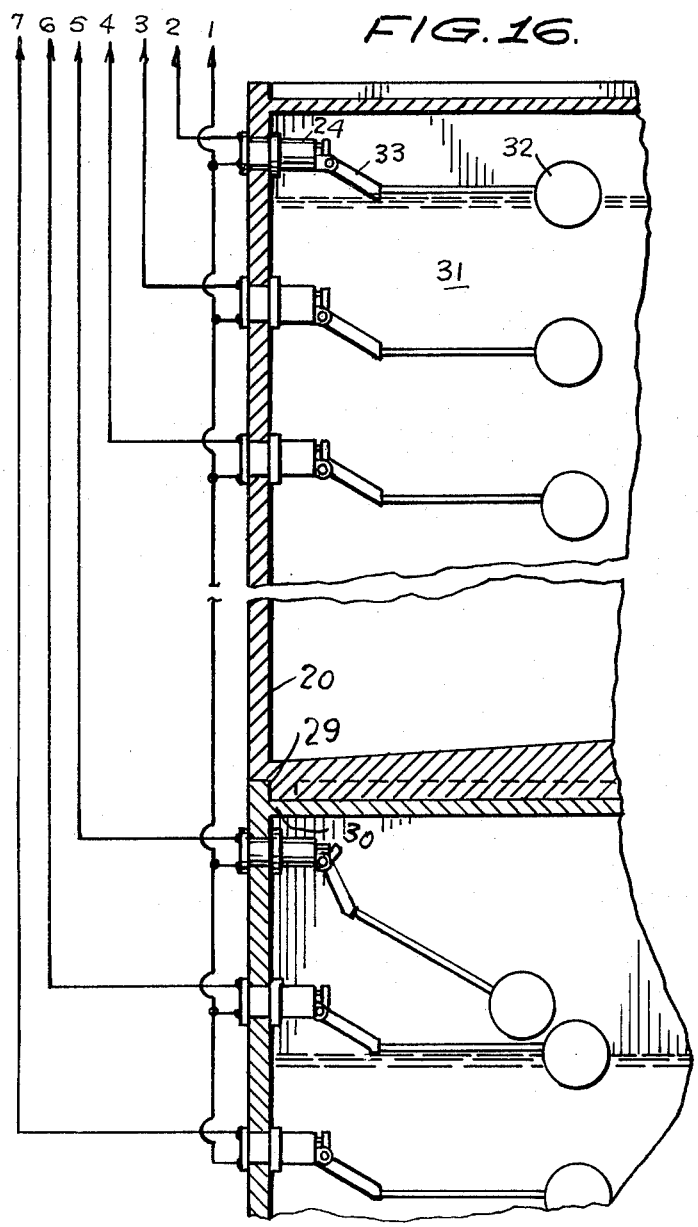
FIG. 16.
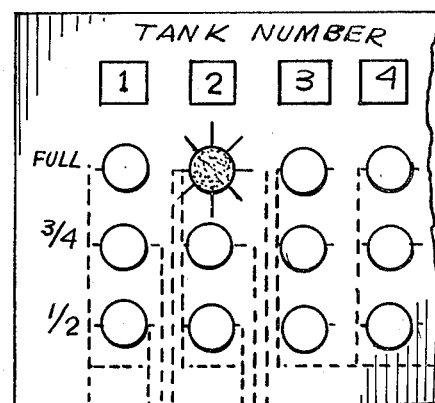
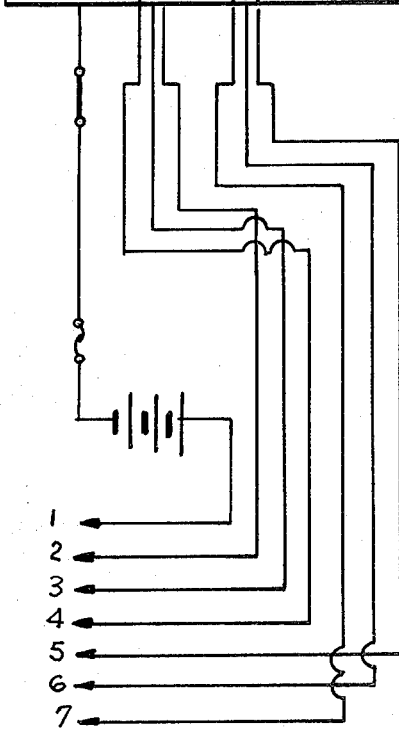
FIG. 17.

OIL SPILL CONTAINMENT DEVICE FOR AQUATIC VESSELS

BACKGROUND OF THE INVENTION

In view of recent catastrophes involving oil tankers, drilling platforms and the like, the need for an effective oil containment device is beyond despute. Prior art devices which have attempted to address themselves to this problem include the following U.S. Pat. Nos. 2,240,567, 3,183,876, 4,000,532 and 4,015,431.

The patent to Ahiko U.S. Pat. No. 4,015,431 teaches the use of a floatable oil fence designed such that the boom portion can absorb impacts from other vessels without losing its ability to float. However the means for interconnecting a plurality of these booms has been found to provide a stress area suspectable to crimping and deformation to the extent that an area for ingress and egress of oil contaminates is possible whether or not the main floating boom portion has been punctured. Further however the structure associated with the interconnection of plural booms is not only readily assessable, but also is not readily disposed for easy disconnections so as to replace damaged sections.

Nielsen, U.S. Pat. No. 4,000,532 teaches the use of a structure for providing a space between a containment boom and a vessel so as negate the affects of tidal currents etc and this structure, while addressing itself to the problems of properly orienting the boom, does not in and of itself provide a unitized integral apparatus for constraining the fending device along with the boom together. That is, the fending device thereafter becomes a problem in that it tends to migrate from areas that require this spacing.

Kronhaus U.S. Pat. No. 3,183,876 teaches the use of an apparatus for temporarily sealing an aperture in the outer periphery of a ships skin not only to assure that the ship will remain afloat, but also as a means for preserving the cargo contained therein. This structure includes an outer skin deployable over the ships outer hull that is to be localized near the aperture so as to provide containment of any spillage also to minimize the amount of incoming sea water thereby reducing the severity of any punctures along the hull.

SUMMARY OF THE INVENTION

The present invention however contemplates providing a structure capable of not only containing contaminates that are inadvertantly or accidentially expelled by vessels, but also is designed to minimize the quantity of material thus dispensed by a containerized arrangement within the cargo hold.

Further the present invention contemplates as an object to provide a flotation collar oil containment device capable of being disposed around the outer periphery of the ship provided with integral constraints to control the marginal area between the ship and the oil collar or fence.

A further object contemplates providing a oil containment device which is easily deployable, and easily separable for maintenance and storage.

A further object contemplates providing an oil containment device which is durable, lightweight, and able to withstand impact from foreign objects.

Still a further objective contemplates providing an indicator assemblage whereby fluid loose within one of a plurality of compartments or containers is quickly discernible and means are provided for the transferral of these fluids from a damaged container to another integral one.

These and other objects will be made manifest when considering the following detailed specification and drawings.

BRIEF DESCRIPTION OF THE DRAWINGS

FIG. 1 depicts a top plan view of a vessel having the oil containment device disposed thereon;

FIG. 2 shows an alternative embodiment in which the oil containment device is disposed on the side portion of the ship;

FIG. 3 is an end view of the view show in FIG. 2;

FIG. 4 shows the oil containment device of either FIG. 1 or 2 in its deployed state;

FIG. 5 is another view thereof taken from the side along the waterline;

FIG. 6 is an end view thereof;

FIG. 7 shows the structure associated with the oil containment device;

FIG. 8 shows the means for interconnecting a plurality of these booms;

FIG. 9 shows a container disposed within the cargo area of such a ship which would minimize liquid contamination;

FIG. 10 is an isometric view of that shown in FIG. 9;

FIG. 11 is a top plan view of the oil collar disposed around a drilling platform;

FIG. 12 shows a sectional view taken along lines 12—12 of FIG. 8;

FIG. 13 is an additional embodiment of that which is shown in FIG. 8;

FIG. 14 is a sectional view taken along lines 14—14 of FIG. 7;

FIG. 15 is a sectional view of the ship showing the disposition of a plurality of containers shown in FIGS. 9 and 10;

FIG. 16 shows an indicator or alarm system associated with the containers of FIGS. 15, 9 and 10;

FIG. 17 shows circuitry associated with the alarms of FIG. 16; and

FIG. 18 shows an alternative embodiment to that which is depicted in FIG. 16.

DESCRIPTION OF THE PREFERRED EMBODIMENTS

Referring to the drawings now wherein like reference numerals refer to like parts throughout the various figures, reference numeral 10 is generally directed to the oil flotation collar structure according to the present invention.

This collar 10 may generally be regarded as comprising a plurality of flotation elements 1 serially connected to surround the outer periphery of a vessel at a discrete distance. These collar elements 1 are constrained from motion so that the distance between the ship and these collars is fairly constant by means of rib members 14 whose structure will be delineated hereinafter. The collars 1 are provided with depending skirts 7 as best seen in FIG. 6 comprised of a plurality of panels having a horizontal extent generally similar to the length of the collars 1 and are provided with weights W at their terminal portions remote from the collar so as to assure that these skirts 7 will not roll up or be deflected with tidal conditions. Further, these skirts have a portion which extends above the water level and above the collar so as to deflect any contaminants which may splash by tidal action against the side of the ship etc. and cause these contaminants to be rediverted between the collar and the ship proper. The collar is connected to the ship by means of ribs 14 which may have extending therebetween sheets 6 which would also tend to abate any upwardly directed splashes.

The specifics of this structure will now be discussed in reference to the ship shown in FIGS. 1 through 7, but it is to be understood that this structure applies equally as well to the oil platform of FIG. 11 in which the platform is denoted by reference numeral 40 and a gangplank 41 is disposed thereon.

A plurality of these collars 1 are generally comprised of an outer portion having disposed therein a plurality of tubular rod members 4 (FIG. 8) which are each individually inflatable, or made of foam material for buoyancy. The terminal portions of these collars 1 where they register with each other, is provided such that each collar has a substantially similar diameter. A sleeve 2 is caused to overlie the terminal portions of the two abutting collars so that upon inflation (FIG. 13) the sleeve crimps the terminal portion of two adjoining collars and provides a good connection. It is to be noted that the sleeves are of such a diameter that the expansion created in the collars 1 causes a bulge and the sleeves define a narrow tapered portion. Alternatively, if the material to be used is expanded foam, the sleeve has merely a snug fit in relationship to the collar and is fastened thereto by means of pins 3. These pins of course may be used in the inflated version.

It is contemplated that the skirts 7 are supported by the collars 1 via hook elements 8 integral with the skirts which are caused to overlie the collars as best seen in FIG. 7, but equivalent fastening structure could be used. In this specific structure however the skirts are capable of easy disassembly for storage when not in use. A plurality of these skirts are interconnected by means of mechanical hook and eyelets 9 and 11 as shown in FIG. 7 which take up the major forces and stresses associated with disposing these skirts in a liquid environment, but a true seal between the adjacent skirts is provided by means of pockets that run along the vertical extent of the lap seam of adjoining skirts denoted by reference numerals 17 and 18. These pockets contain on one skirt metal filings 12 as shown in FIG. 14 and in the adjoining skirt this pocket contains permanent magnets 13 having sufficient strength to assure that the interconnection between the skirts is liquid tight. However the main mechanical interconnection between adjoining skirts is provided by the hook and eyelets.

FIG. 4 shows a vessel in which the collar has been deployed and it is to be noted that the rib member 14 is generally depicted as being tubular. This rib 14 may merely be a rope element or cable and if this is the case it is deployed through a tension sensing device integral with unit 19 that is provided with comparitors to assure that the cable tension is uniform throughout the various cables. The cables are alternatively extended or retracted as a function of pressure differentials in a manner well known in the art so as to provide an even stress distribution throughout.

However, a few of these ribs 14 may be of rigid configuration so that the distance between the collar and the ship can be kept constant. This rigidity may come from the use of a rigid foam material or air pressure as shown by the structure of FIG. 8. In this event, the units designated by reference numeral 19 would be air compressors or compressed air storage tanks. These sources of air 19 in any event also are operatively connected to the collars so as to assure that they are maintained in an inflated condition.

When the oil containment device is not to be utilized, deflating the collars and ribs and storage of the sheets provide a storage structure which is relatively unobtrusive and compact in form.

FIGS. 9 and 10 and 15 through 18 depict a compartmentalization technique associated with a vessel wherein discrete quantums of fluid substances such as oil can be stored to minimize severity of any spill should it occur through a puncture in the outer plating of the vessel. In addition however it should be appreciated that different types of liquids could be stored in different compartments thereby providing versitility to the loads that are able to be carried therewithin. The vessel or ship S as shown in cross section FIG. 15 is provided with a plurality of these compartments all of which can be characterized in that indicators are integral with these compartments 20 to indicate the liquid level status of each compartment. Specifically, these compartments 20 generally regarded as hollow rectanguloids are provided with on the top face an upstanding lip 30 extending around the upper periphery thereof and having upper and lower orifices 21 centrally disposed.

A sectional view as best depicted in FIG. 9 shows that the container 20 has a medially disposed support rib 38 throughwhich orifices 28 are provided. The central portion of this support rib 38 serves to nest there on upper and lower valve elements 24 actuated by suitable means. In this specific instance, a solenoid actuation device has been shown wherein the valve closure 24 is provided with a circular stepped portion 23 which communicates with the downwardly and outwardly extending flared rim 22 of opening 21. A shaft element eminates away from this circular portion and disposed within the shaft 25 is a spring 26 and communicating therewith is an electro magnet 27. In use and operation therefore it will be perceived that these valves are normally in the closed mode when the solenoid is deenergized so that the valve is effectively sealed off shut should there be no power. It is to be further noted that the bottom portion of each of these containers 20 is provided with a stepped portion 29 which can nest against the lip 30 of a successive container so that these containers may be stacked and secured thereby.

An additional structure associated with these containers includes float elements 32 and 35 (FIGS. 16 and 18) connected to switch elements 34 and 37 through arm members 33 and 36. When disposed in the fluid, the plural floats provide an indication of the quantity of fluid contained therein and leakage can therefore be readily detected by collating the indicator panel assemblies light board indicator system (FIG. 17) with its associated tank number. In this way, leaks can be readily identified, and transferral of a portion of a tank that has been punctured and is leaking can proceed in a simple fashion. The float element of FIG. 16 shows that contact is broken when the float is caused to rotate in its lowest position, whereas in FIG. 18, the pure vertical displacement in a negative sense of the float will provide a change on the indicator panel.

The containers 20 are all provided with additional valves V1 along a bottom edge thereof to assist in flushing, transferral, etc. Further, however, although the major valves 24 are pictured in a vertical sense, it should be apparent that the containers may also be nested such that these valves are oriented horizontally.

Having thus described the invention it will be appreciated that numerous structural modifications are contemplated as being an integral part of this invention as described above and as defined in the claims.

What is claimed is:

1. An oil containment device comprising a plurality of collar elements interconnected to surround a vessel, a plurality of flexible, weighted skirt members fastened to said collars depending therefrom and also interconnected to surround said vessel, said skirt elements are interconnected by mechanical hook and eyelet fasteners in which said mechanical hook fasteners are disposed on a vertical edge of one skirt and the eyelets are disposed on a vertical edge of another skirt adapted to register therewith, and wherein said skirts are further interconnected by means of magnetic attraction in which pockets are disposed in each vertical edge of the registering skirts colinear with said hook and eyelet and wherein one pocket contains metal filings and said other pocket contains a permanent magnet and tether means connecting said vessel to said collar elements so as to control the distance between said vessel and said collar elements which surround the periphery of said vessel.

2. The device of claim 1 in which said collars are comprised in their central core area of a plurality of tubes containing foam.

3. The device of claim 1 in which said collars contain a plurality of air cylinders.

4. The device of claim 3 in which said air cylinders are caused to expand such that the sleeve overlying a juncture between two collars is retained by air pressure.

5. The device of claim 4 in which said collar and tethers are inflated by compressed air storage means disposed on said vessel.

6. The device of claim 1 in which said tethers are inflatable and wherein sheets are disposed and interconnected between said tethers.

7. An oil containment device comprising a plurality of collar elements interconnected to surround a vessel, a plurality of skirt members fastened to said collars and also interconnected to surround said vessel, means to deploy and retract said oil containment device whereby when retracted, said oil containment device rests on board around the top periphery of the vessel, and tether means connected said vessel to said collar elements so as to control the distance between said vessel and said collar elements which surround the periphery of said vessel and said skirt members are interconnected by mechanical hook and eyelet fasteners in which said mechanical hook fasteners are disposed on a vertical edge of one skirt and the eyelets are disposed on the vertical edge of another skirt adapted to register therewith, and wherein said skirts are further interconnected by means of magnetic attraction in which pockets are disposed in each vertical edge of the registering skirts colinear with said hook and eyelet and wherein one pocket contains metal filings and said other pocket contains a permanent magnet.

8. The device of claim 7 in which a weight is disposed at the terminal portion of said skirt remote from said collar.

9. The device of claim 8 in which said collars are interconnected by means of a sleeve which overlies adjacent collars.

10. The device of claim 9 in which said collars are comprised in their central core are of a plurality of tubes containing foam.

11. The device of claim 9 in which said collars contain a plurality of air cylinders.

12. The device of claim 11 in which said air cylinders are caused to expand such that the sleeve overlying a juncture between two collars is retained by air pressure.

13. The device of claim 12 in which said collar and tethers are inflated by compressed air storage means disposed on said vessel.

14. The device of claim 9 in which said tethers are inflatable and wherein sheets are disposed and interconnected between said tethers.

15. An oil containment device comprising a plurality of collar elements interconnected to surround a vessel, a plurality of skirt members fastened to said collars and also interconnected to surround said vessel by magnetic means, and tether means connecting said vessel to said collar elements so as to control the distance between said vessel and said collar elements which surround the periphery of said vessel in which a weight is disposed at the terminal portion of said skirt remote from said collar and said collars are interconnected by means of a sleeve which overlies adjacent collars, and elements are interconnected by mechanical hook and eyelet fasteners in which said mechanical hook fasteners are disposed on a vertical edge of one skirt and the eyelets are disposed on the vertical edge of another skirt adapted to register therewith, and wherein said skirts are further interconnected by means of magnetic attraction in which pockets are disposed in each vertical edge of the registering skirts colinear with said hook and eyelet and wherein one pocket contains metal filings and said other pocket contains a permanent magnet.

16. The device of claim 15 in which said collars are interconnected by means of a sleeve which overlies adjacent collars.

17. The device of claim 16 in which said collars are comprised in their central core area of a plurality of tubes containing foam.

18. The device of claim 16 in which said collars contain a plurality of air cylinders.

19. The device of claim 18 in which said air cylinders are caused to expand such that the sleeve overlying a juncture between two collars is retained by air pressure.

20. The device of claim 19 in which said collar and tethers are inflated by compressed air storage means disposed on said vessel.

21. The device of claim 16 in which said tethers are inflatable and wherein sheets are disposed and interconnected between said tethers.

22. A device for containing liquids comprising a hollow container, a structural rib disposed within said container having means defining openings therethrough, valve means disposed on said rib structure adapted to seal upper and lower openings, plural level indicators responsive to liquid level to determine the quantity of liquid within the vessel and said valve means are disposed in back to back relationship and expand to seal said upper and lower openings.

23. The device of claim 22 wherein said valve means are actuated by a solenoid.

24. The device of claim 23 in which said liquid level indicators includes a plurality of float elements connected to switching means through a lever in which the circuit is energized when the tank is full.

* * * * *